United States Patent

[11] 3,625,375

[72] Inventor Johann Lingl
Finningerstrasse 70, Neu-Ulm/Danube, Germany
[21] Appl. No. 24,262
[22] Filed Apr. 22, 1970
[45] Patented Dec. 7, 1971
Continuation of application Ser. No. 645,850, May 31, 1967, now abandoned. This application Apr. 22, 1970, Ser. No. 24,262

[54] METHOD AND APPARATUS FOR POSITIONING MATERIAL SUCH AS BRICK BLANKS, IN STACKS
9 Claims, 7 Drawing Figs.
[52] U.S. Cl. .................................................. 214/6 A, 198/34, 214/152
[51] Int. Cl. ..................................................... B65g 57/26
[50] Field of Search ........................................... 214/6, 6 A, 6 P, 152; 198/34, 135

[56] References Cited
UNITED STATES PATENTS
2,944,687 7/1960 Segur et al. ................. 214/6 A X
3,297,135 1/1967 Piroutek ...................... 198/34
FOREIGN PATENTS
1,015,171 12/1965 Great Britain ............... 214/6 A Primary Examiner—Gerald M. Forlenza
Assistant Examiner—Robert J. Spar
Attorneys—Cushman, Darby & Cushman, Steward & Steward, Roy F. Steward, Merrill F. Steward and Donald T. Steward ABSTRACT: A method and apparatus for assembling bricks in layers or flats for stacking on a kiln car or the like wherein bricks of different sizes can be assembled in transverse rows that are spaced at various distances from one another by first moving the bricks in longitudinal rows on a feed belt against a stop which compacts them together longitudinally of the feed belt and at the same time aligns them into the transverse rows, which are then moved onto a transfer belt by automatically programming the starts and stops of the feed belt as the transfer belt is run continuously during the assembly of the layer, so that each row is moved onto the transfer belt and then moved a predetermined distance to space it the required amount from the next row on the feed belt while the latter is momentarily stopped. The invention also includes a method and means for forming oblong stacks by feeding different numbers of longitudinal rows for alternate layers of the stack, the number of longitudinal rows for alternate layers of the stack, the number of longitudinal rows for alternate layers of the stack, the number of longitudinal rows for alternate layers of the stack, the number of longitudinal rows for one layer corresponding to the length of the stack and the number of longitudinal rows for the alternate layer corresponding to the width of the stack.

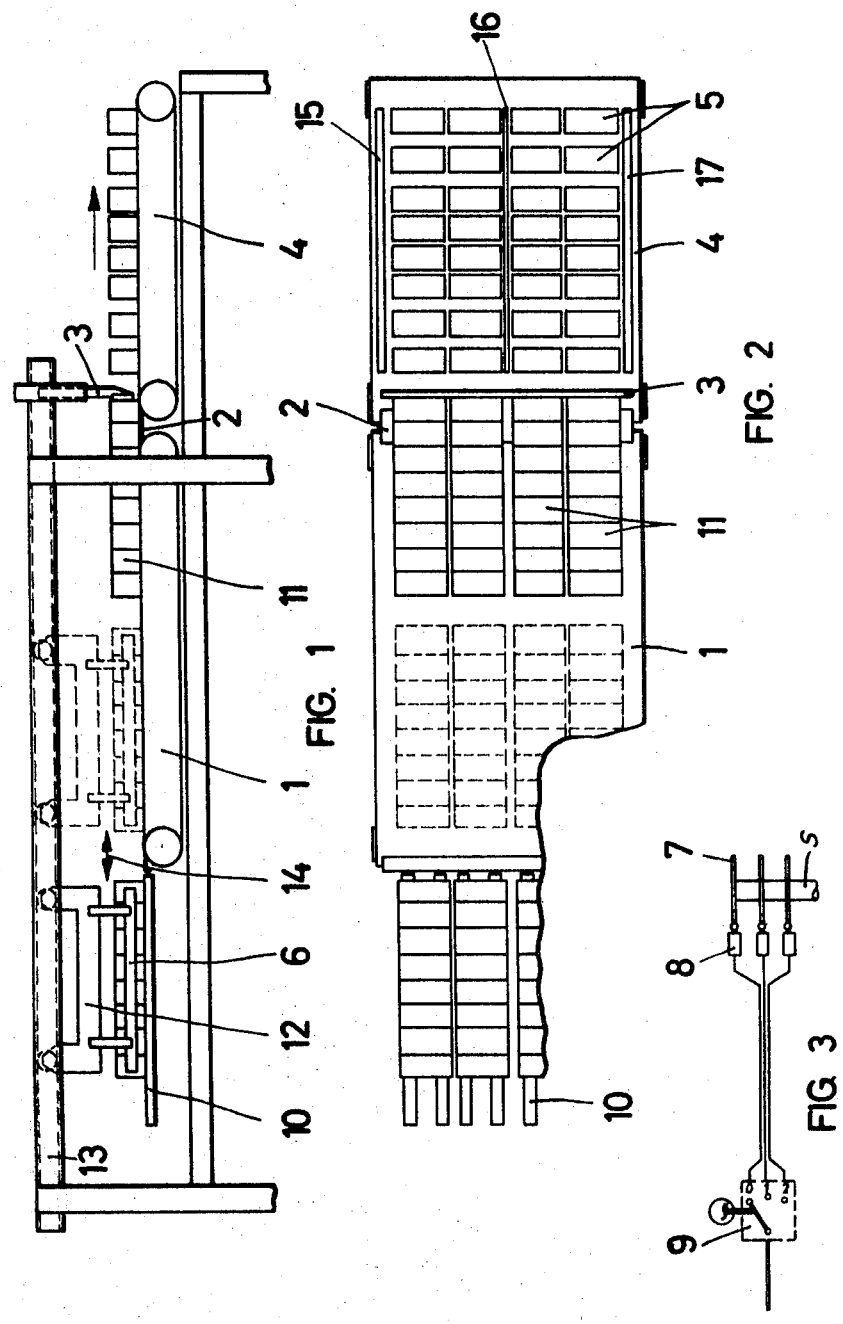

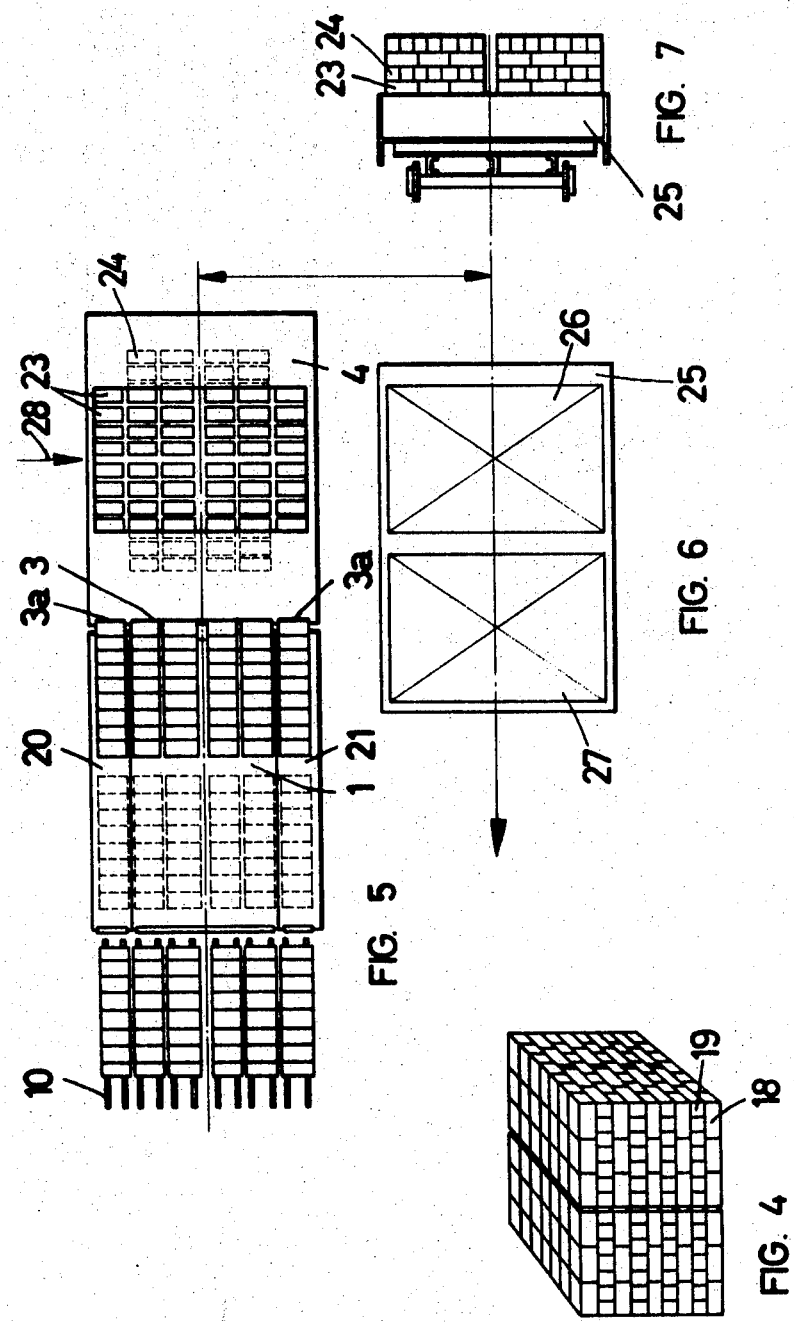

METHOD AND APPARATUS FOR POSITIONING MATERIAL SUCH AS BRICK BLANKS, IN STACKS

This application is a continuation of 645,850, filed May 31, 1967, and now abandoned.

The invention relates to a method and apparatus for positioning material, such as brick blanks, in stacks. In brick manufacture the bricks have to be stacked on the kiln carriages for firing and, after firing, are reloaded for transportation to building sites.

It is an object of the present invention to enable different sizes of bricks to be stacked without laborious readjustment of the apparatus used for stacking. Another object of the present invention is to enable the distances between individual transverse rows in a layer of bricks for stacking to be varied as required, thus satisfying the requirements for a cohesive stack construction and providing gaps in the stack through which the fire gases can pass and the prongs of stacking devices or grabs can be introduced.

To this end, according to the invention, the material for stacking is deposited or pushed in a number of longitudinal rows disposed one beside the other on a feed belt; the feed belt is started and the individual longitudinal rows of the material for stacking are advanced as far as a fence; after the feed belt is stopped, the fence is raised, and the feed belt and an adjoining transfer belt are started, so that the aligned rows of material for stacking are supplied one after the other to the transfer belt, but the feed belt is automatically started and stopped by a switching system at intervals such as to form on the transfer belt a layer of material for stacking in which the individual transverse rows are disposed at the correct distances for stacking, whereafter the layers formed are raised by a grab and stacked.

The use of the method according to the invention enables cohesive stack constructions to be formed and different grid-shaped arrangements of the material for stacking to be obtained as required.

The method according to the invention is equally suitable for the preparation of square or oblong rectangular stacks. After a layer for stacking has been deposited on the transfer belt, the layer is lifted by a grab and deposited, for instance, on a tunnel kiln carriage. To produce a crosswise stacking on the carriage, every second layer, after it has been lifted from the transfer belt, is rotated through 90° by the grab.

According to another feature of the invention, to form an oblong rectangular stack, a number of longitudinal rows of the material for stacking corresponding to the width of the stack is fed to the transfer belt alternately with a number of longitudinal rows corresponding to the length of the stack. Apparatus for this purpose must of course be such that the number of bricks supplied in longitudinal rows to the transfer belt changes alternately in dependence on the relationship between stack length and stack width.

In order that the invention may be more readily understood, reference is made to the accompanying drawings which more or less schematically illustrate by way of example, two embodiments thereof and in which:

FIG. 1 is an elevation of the main apparatus required for the performance of the invention;

FIG. 2 is a plan view of the apparatus shown in FIG. 1;

FIG. 3 is a diagram showing a switching system for the apparatus shown in FIGS. 1 and 2;

FIG. 4 shows a stack which can be produced by means of the apparatus.

FIG. 5 is a plan view of a feed belt and transfer belt, slightly modified from that shown in FIGS. 1 and 2, on the assumption that the apparatus is to produce a rectangular stack;

FIG. 6 is a plan view of a tunnel kiln carriage on to which the layers raised from the feed belt shown in FIG. 5 can be deposited; and FIG. 7 is a side view of the kiln carriage shown in FIG. 6.

The apparatus comprises a conveyor track having a feed belt 1 and a transfer belt 4 connected to one another via a transfer tongue 2.

As shown in FIGS. 1 and 2, the brick blanks are supplied disposed in longitudinal rows one beside the other on carrying battens 10 from a vertical conveyor or conveyor belt. Referring again to FIGS. 1 and 2, the brick blanks are gripped by lateral plates 6 of a transfer grab 12 moving in a guide rail 13. The grab 12 then deposits the longitudinal rows of brick blanks on the feed belt 1; the grab moving in the directions shown by an arrow 14. The deposited brick blanks are shown in chain lines in FIGS 1 and 2. Next the feed belt 1 is started, and the individual longitudinal rows 11 of brick blanks move forward as far as a fence 3 which aligns the blanks in transverse rows. After the longitudinal rows have reached the fence 3, the feed belt 1 is stopped and the fence 3 is raised. The feed belt 1 and the transfer belt 4 are then conveniently driven at the same speed, so that each transverse row 5 is successively transferred to the belt 4. After the first transverse row 5 has been transferred to the belt 4, the drive of the belt 1 is interrupted until the next transverse row is taken over by the belt 4 at the corresponding distance from the first transverse row. This operation is repeated every time a transverse row is taken over by the belt 4.

Different distances between the transverse rows can be produced by the drive of the feed belt 1 being stopped for different times.

As can be seen in FIG. 2, the events just described have formed on the transfer belt 4 a layer for stacking having spaced transverse rows the distance of the rows from one another being variable. The layer is then seized by a grab, illustrated in FIG. 2 merely by its plates 15, 16 and 17. The two outer grab plates 15 and 17 engage the end faces of the transverse rows and force the brick blanks against the central intermediate plate 16. When the bricks have been seized, the layer is lifted by the grab and deposited on a tunnel kiln carriage.

FIG. 3 shows a switching system for controlling the deposition of the bricks on the transfer belt. A number, for instance three, of programming discs 7 connected to a limit switch 8 are disposed on a shaft S of a timer, which is driven in dependence on or synchronized with, the movement of the transfer belt 4. Disposed on each of the programming discs 7 are switch cams which act on the associated switch B to stop the belt 1 at intervals and for a duration such as to produce the required grid-shaped arrangement of blanks on the transfer belt 4. Each individual programming disc 7 is associated with a different grid shape and can be brought into operation as required by a selector switch 9. Selection of a particular cam disc 7 therefore so controls the feed belt 1 as to produce on the transfer belt 4 a layer for stacking having the required distance between the individual transverse rows.

As already stated, after a layer has been prepared the fence 3 is lowered and then after the blanks have been aligned is lifted again.

Advantageously the fence is moved pneumatically. The whole control process may be performed automatically by means of sequential switching or programming.

FIG. 4 shows an example of a stack of bricks in which the individual layers are deposited crosswise. The result is a stack which has enough gaps, for instance, to allow the fire gases to pass through during firing. In accordance with the invention either square or oblong stacks can be formed.

FIGS. 5, 6 and 7 show how the use of the present invention enables a rectangular stack to be formed. FIG. 5 is a plan view corresponding to FIG. 2, with the difference as against the latter that FIG. 5 shows a total of six longitudinal rows fed on battens 10 to the supply belt 1. In the embodiment shown in FIG. 5 the supply belt 1 is widened by two further belts 20 and 21, which adjoin the belt 1 on both sides, but have a separate drive. Also the fence 3 is widened by extra fences 3a. The brick blanks are transferred from the belts 1, 20 and 21 to the transfer belt 4, which is also widened, in the same way as explained in relation to FIGS. 1 and 2. The belts 1, 20 and 21 are first driven simultaneously, to transfer the layer formed by the individual transverse rows 23 to the transfer belt 4. The layer is lifted by a grab, in the same way as shown in relation to FIG.

2, and deposited in the direction shown by an arrow 28 on a tunnel kiln carriage 25 (FIG. 6). However, to form the next layer, the belts 20 and 21 remain stationary, and only the central feed belt 1 is started. A layer is therefore formed on the transfer belt 4 which comprises individual transverse rows 24 (shown in chain lines in FIG. 5). Enough transverse rows of bricks are fed by the belt 1 for this second layer so that its length corresponds exactly to the width of the previously deposited layer, consisting of the transverse rows 23. The layer shown in chain lines, comprising the transverse rows 24, is then raised in the same way by the grab, whereafter the grab is rotated through 90° to deposit the second layer over the first layer on the tunnel kiln carriage shown in FIG. 6. By the alternation of these events a rectangular stack 26 is formed on the tunnel kiln carriage 25. The layers 23 and 24 deposited alternately are shown in FIG. 7.

Since the tunnel kiln carriage 25 is generally wide enough to take two stacks, after one stack has been deposited the carriage is advanced, whereafter the second stack 27 is deposited.

Lastly, the feed of the brick blanks to the depositing system according to the invention has been illustrated merely diagrammatically. Instead of using the transfer grab 12, of course, the bricks arriving on the carrying battens 10 can be pushed onto the feed belt 1 by a pushing device. The grab seizing the layers from the transfer belt 4 can also be of any construction. Only one embodiment thereof, having side plates 15 and 17 and an intermediate plate 16, is shown in FIG. 2.

What I claim is:

1. A method of stacking bricks which comprises the steps of moving a plurality of adjacent longitudinal rows of brick onto a feed belt, aligning the bricks in transverse rows by moving said longitudinal rows lengthwise against a fence, thereupon raising said fence and starting said feed belt in order to move a first of said transverse rows onto a transfer belt while running said transfer belt in the same direction as, and at substantially the same speed as, said feed belt, stopping said feed belt for a predetermined length of time when said first transverse row is disposed on said transfer belt while continuing to run said transfer belt such that said first transverse row is spaced a predetermined distance from the next transverse row on said feed belt, and sequentially starting and stopping said feed belt in time relation with the speed of said transfer belt in order to form a layer of said transverse rows on said transfer belt with said transverse rows spaced at predetermined distances from each other, and thereafter gripping the ends of said transverse rows while maintaining the spacing between them in order to lift them as a layer, and then depositing said layer at a stacking station.

2. A method as claimed in claim 1 in which every second layer removed from the transfer belt is rotated through 90° in relation to the preceding layer before being deposited.

3. Apparatus for assembling and stacking bricks comprising in combination a conveyor feed belt movable in one direction and a transfer belt disposed in the same plane at the discharge end of said feed belt substantially contiguous therewith and movable in same direction and at the same speed as said feed belt, means for moving bricks onto said feed belt in a plurality of adjacent longitudinal rows, a stop disposed at the discharge end of said feed belt and movable into and out of the path of longitudinal rows of bricks for aligning said bricks in transverse rows across said feed belt, a timer synchronized with movement of said transfer belt for automatically starting said feed belt in order to move said transverse rows successively onto said transfer belt while the latter is moving and for stopping said feed belt after predetermined intervals, the length of which depend on the size of said brick, and for predetermined lengths of time in order to space said transverse rows any desired distance one from the other on said transfer belt, said timer having means for programming such intermittent movement of said feed belt such that a layer of said transverse rows is assembled on said transfer belt with the desired spacing between said rows, and means for gripping said layer at the ends of said transverse rows, for lifting it from said transfer belt without disturbing the spacing between said transverse rows and for depositing said layer at a stacking station.

4. Apparatus as defined in claim 3 wherein said feed belt comprises a plurality of parallel belts, each independently driven and controlled, so that the number of said longitudinal rows of bricks being fed to said transfer belt can be varied in order to vary the length of said transverse rows for different layers.

5. Apparatus as defined in claim 3, wherein said programming means comprises a plurality of cam disks and a limit switch associated with each of said cam disks for starting and stopping said feed belt, and a selector switch for shifting from one cam disk to another in order to change the program for different size bricks and for changing the spacing between said transverse rows of bricks.

6. A method of stacking bricks which comprises the steps of moving a plurality of adjacent, parallel and longitudinal rows of brick onto a feed belt, transversely aligning the bricks in said rows on said feed belt while moving said rows thereon, moving said feed belt to transfer a first of said transverse rows onto a transfer belt while running said transfer belt in the same direction as, and at substantially the same speed as, said feed belt, stopping said feed belt for a predetermined length of time when said first transverse row is disposed on said transfer belt while continuing to run said transfer belt such that said first transverse row is spaced a predetermined distance from the next transverse row on said transfer belt, and sequentially starting ans stopping said feed belt for predetermined intervals in timed relation with the speed of said transfer belt, the length of said intervals depending upon the size of said brick in order to space said transverse rows one from another thereby forming a layer of said transverse rows on said transfer belt with said transverse rows spaced at predetermined distances from each other, and thereafter gripping the ends of said layer of transverse rows while maintaining the spacing between the rows, lifting the gripped layer, and then depositing said gripped layer in a stack at a stacking station.

7. A method as claimed in claim 6 in which every second layer removed from the transfer belt is rotated through 90° in relation to the preceding layer before being deposited.

8. Apparatus for assembling and stacking bricks comprising in combination a conveyor feed belt movable in one direction and a transfer belt disposed in the same plane at the discharge end of said feed belt substantially contiguous therewith and movable in same direction and at the same speed as said feed belt, means for moving bricks onto said feed belt in a plurality of adjacent, parallel and longitudinal rows, means for aligning said bricks in transverse rows across said feed belt, timing means synchronized with movement of said transfer belt for automatically starting said feed belt in order to move said transverse rows successively onto said transfer belt while latter is moving and for stopping said feed belt after predetermined intervals, the length of said intervals depending on the size of said brick, and for predetermined lengths of time in order to space said transverse rows predetermined distances one from the other on said transfer belt such that a layer of said transverse rows is assembled on said transfer belt with predetermined spacing between said rows, and means for gripping said layer at the ends of said transverse rows, for lifting it from said transfer belt without disturbing the spacing between said transverse rows and for depositing said layer in a stack at a stacking station.

9. Apparatus as defined in claim 8 wherein said feed belt comprises a plurality of parallel belts, each independently driven and controlled, so that the number of said longitudinal rows of bricks being fed to said transfer belt can be varied in order to vary the length of said transverse rows for different layers.

* * * * *